US009062788B2

(12) United States Patent
Mainland et al.

(10) Patent No.: US 9,062,788 B2
(45) Date of Patent: Jun. 23, 2015

(54) LATCHING SOLENOID ACTUATOR WITH CONTAINER INSTALLATION DETECTION

(75) Inventors: Mark William Mainland, Greenfield, WI (US); Wayne Michael Groth, Sussex, WI (US); Derek Arvid Dahlgren, Sussex, WI (US)

(73) Assignee: TLX Technologies, LLC, Pewaukee, WI (US)

( * ) Notice: Subject to any disclaimer, the term of this patent is extended or adjusted under 35 U.S.C. 154(b) by 882 days.

(21) Appl. No.: 13/301,277

(22) Filed: Nov. 21, 2011

(65) Prior Publication Data

US 2013/0126328 A1 May 23, 2013

(51) Int. Cl.

| | |
|---|---|
| ***F16K 27/02*** | (2006.01) |
| ***F16K 31/10*** | (2006.01) |
| ***F16K 37/00*** | (2006.01) |
| ***H01H 35/26*** | (2006.01) |

(52) U.S. Cl.

CPC ......... *F16K 27/029* (2013.01); *Y10T 29/49002* (2015.01); *F16K 31/10* (2013.01); *F16K 37/0041* (2013.01); *H01H 35/26* (2013.01)

(58) Field of Classification Search

CPC ..... F16K 1/306; F16K 15/20; F16K 31/0655; F16K 37/0041; F16K 31/10; F16K 1/308; F16K 27/029

USPC ............ 137/15.18, 315.03, 553, 554, 315.11, 137/454.6, 233; 251/129.15, 81, 95, 291; 285/93

See application file for complete search history.

(56) References Cited

U.S. PATENT DOCUMENTS

| | | | |
|---|---|---|---|
| 3,664,430 A | 5/1972 | Sitabkhan | |
| 4,482,018 A | 11/1984 | Enk et al. | |
| 4,566,542 A | 1/1986 | Enk et al. | |
| 6,488,099 B2 | 12/2002 | McSheffrey et al. | |
| 6,585,055 B2 | 7/2003 | McSheffrey et al. | |
| 6,649,829 B2 | 11/2003 | Garber et al. | |
| 6,739,578 B2 | 5/2004 | Barton et al. | |
| 6,897,374 B2 | 5/2005 | Garber et al. | |
| 6,991,211 B2 * | 1/2006 | Altonji | 251/63 |
| 7,081,815 B2 | 7/2006 | Runyon et al. | |
| 7,174,769 B2 | 2/2007 | McSheffrey, Jr. et al. | |
| 7,174,783 B2 | 2/2007 | McSheffrey, Jr. et al. | |
| 7,188,679 B2 | 3/2007 | McSheffrey et al. | |
| 7,574,911 B2 | 8/2009 | McSheffrey et al. | |
| 7,726,411 B2 | 6/2010 | McSheffrey, Jr. et al. | |
| 7,841,357 B2 | 11/2010 | Rankin | |
| 7,891,241 B2 | 2/2011 | McSheffrey et al. | |
| 7,891,435 B2 | 2/2011 | McSheffrey et al. | |
| 7,895,884 B2 | 3/2011 | McSheffrey, Jr. et al. | |
| 2004/0036273 A1 | 2/2004 | McClary | |
| 2007/0247265 A1 * | 10/2007 | Medrano et al. | 335/282 |
| 2010/0171624 A1 | 7/2010 | McSheffrey et al. | |
| 2010/0192695 A1 | 8/2010 | McSheffrey, Jr. et al. | |
| 2010/0301245 A1 * | 12/2010 | Accurso et al. | 251/129.15 |
| 2011/0240136 A1 * | 10/2011 | Trottier | 137/15.01 |

* cited by examiner

*Primary Examiner* — Atif Chaudry

(74) *Attorney, Agent, or Firm* — Reinhart Boerner Van Deuren s.c.

(57) ABSTRACT

There is disclosed a mechanism for detecting that a valve coupled to a pressurized container is fully installed into a nose piece of a latching solenoid actuator coupled to a fire suppression system.

20 Claims, 7 Drawing Sheets

144 154 124 111 110 120 160 122 118 D1 D2 130 D3 116 134 140 154 152 136 132 112 128 142

100
101
102
104
106
108
110
165

110
111
112
114
116
134
136
138
140
144
146
148
150
152
154
156
160
162

LATCHING SOLENOID ACTUATOR WITH CONTAINER INSTALLATION DETECTION

BACKGROUND OF THE INVENTION

Field of the Invention

This invention relates to a pressure valve coupled to a pressurized container, and more particularly to a mechanism for detecting that the pressure valve is fully connected to a latching solenoid associated with pressurized container.

Fire suppression systems used pressurized containers of a fire suppressant material under high pressure. These pressurized containers are installed in a system that includes plumbing from each container to a location associated with the fire detection or fire alarm switch used to initiate delivery of the fire suppressant material from the container through the plumbing to suppress the fire. A latching solenoid is activated to operate a valve coupled to the container to release the suppressant material from the pressurized container to the plumbing that delivers the suppressant material to the fire.

The pressurized containers must be pressure tested at regular intervals, typically annually. The pressurized containers may also have to be replaced after use or damage. Since such systems typically contain many such pressurized containers, each pressurized container must be removed from the system, tested, and assuming that it passes the test, reinstalled into the system. Frequently, one or more pressurized containers is not reinstalled, or reinstalled properly, which is a major problem that typically goes undetected.

The National Fire Protection Association has passed requirements, effective in 2016, that fire suppression systems having an electric actuator (latching solenoid) must be "supervised" and provide audible and visual indication of system impairment at the system's releasing control panel. This disclosure is intended to meet such requirements.

It is known to use an electrical conductor and alarm externally attached to the pressurized container, valve, and solenoid to detect that the container is installed in the system. Such sensing circuits detects the presence or absence of a container. However, such sensing circuit will not sense if the valve coupled to the container is fully installed with the actuating solenoid.

The apparatus of the present disclosure must also be of construction which is both durable and long lasting, and it should also require little or no maintenance to be provided by the user throughout its operating lifetime. In order to enhance the market appeal of the apparatus of the present disclosure, it should also be of inexpensive construction to thereby afford it the broadest possible market. Finally, it is also an objective that all of the aforesaid advantages and objectives be achieved without incurring any substantial relative disadvantage.

SUMMARY OF THE INVENTION

The disadvantages and limitations of the background art discussed above are overcome by the present disclosure.

There is provided a mechanical sensor coupled to a latching solenoid, with the solenoid including a nose piece. The solenoid is coupled to a control unit and to a pressure valve of a vessel. The sensor includes a disk configured for reciprocal, axial movement within a first portion of a first bore defined in the nose piece. An electrical switch is disposed in a second bore defined in the nose piece. The electrical switch is coupled to the control unit. A switch push pin is disposed in a portion of the second bore, with the switch push pin in physical contact at one end with the electrical switch, and with a second end extending into the first bore.

When the pressure valve is coupled to the latching solenoid, the pressure valve contacts the disk and moves the disk back against the switch push pin to change the status of the electrical switch to indicate that the pressure valve is properly coupled to the latching solenoid.

A mechanical sensor may further include an adaptor, with the adaptor configured for rotational engagement with the nose piece and the pressure valve. The mechanical sensor may include an electrical switch that is one of a normally open switch and a normally closed switch.

There is further provided a latching solenoid for a pressurized vessel having a pressure valve. The latching solenoid includes a solenoid coupled to a control unit and configured to operate the pressure valve.

A nose piece is coupled to the solenoid. The nose piece defines a first bore, with the first bore including a first portion, a second portion, and a third portion, with each portion having a different inside diameter.

A disk is disposed in the first portion of the first bore. The disk is configured to move a predetermined axial distance in the first portion. A bias member is disposed in the second portion of the first bore. The bias member is configured to force the disk against the retainer member disposed in the nose piece.

A second bore is defined in the nose piece and is in communication with the first portion of the first bore. An electrical switch is disposed in the second bore, with the electrical switch coupled to the control unit. A switch push pin is disposed in a portion of the second bore. The switch push pin is in physical contact at one end with the electrical switch, and with a second end extending into the first bore.

When the pressure valve is properly coupled to the latching solenoid, the pressure valve contacts the disk and moves the disk the predetermined axial distance back against the switch push pin to change the status of the electrical switch to indicate that the pressure valve is properly coupled to the latching solenoid.

There is additionally provided a method of sensing if a pressure valve attached to a vessel is properly coupled to a latching solenoid. The latching solenoid includes a nose piece and an adapter configured for rotational engagement with the nose piece and the pressure valve.

The method includes installing a disk in a first bore defined in the nose piece. The disk is configured for reciprocal axial movement within the first bore. An electrical switch is installed in a second bore defined in the nose piece. The electrical switch is coupled to a control unit coupled to the latching solenoid. A switch push pin is installed in a portion of the second bore. The switch push pin is positioned to make physical contact with the electrical switch at one end of the push pin and another end of the push pin extending into the first bore. The pressure valve is installed in the adapter a distance sufficient to push the disk axially a predetermined distance back in the first bore to contact the switch push pin and move the switch push pin to contact the switch to change the status of the electrical switch indicating that the pressure valve is properly coupled to the latching solenoid. The distance sufficient to push the disk in the first bore is at least ninety percent of the axial length of a first portion of the first bore.

The apparatus of the present disclosure is of a construction which is both durable and long lasting, and which will require little or no maintenance to be provided by the user throughout its operating lifetime. Finally, all of the aforesaid advantages and objectives are achieved without incurring any substantial relative disadvantage.

DESCRIPTION OF THE DRAWINGS

These and other advantages of the present disclosure are best understood with reference to the drawings, in which.

DETAILED DESCRIPTION OF THE EXEMPLARY EMBODIMENTS

Figure 1:
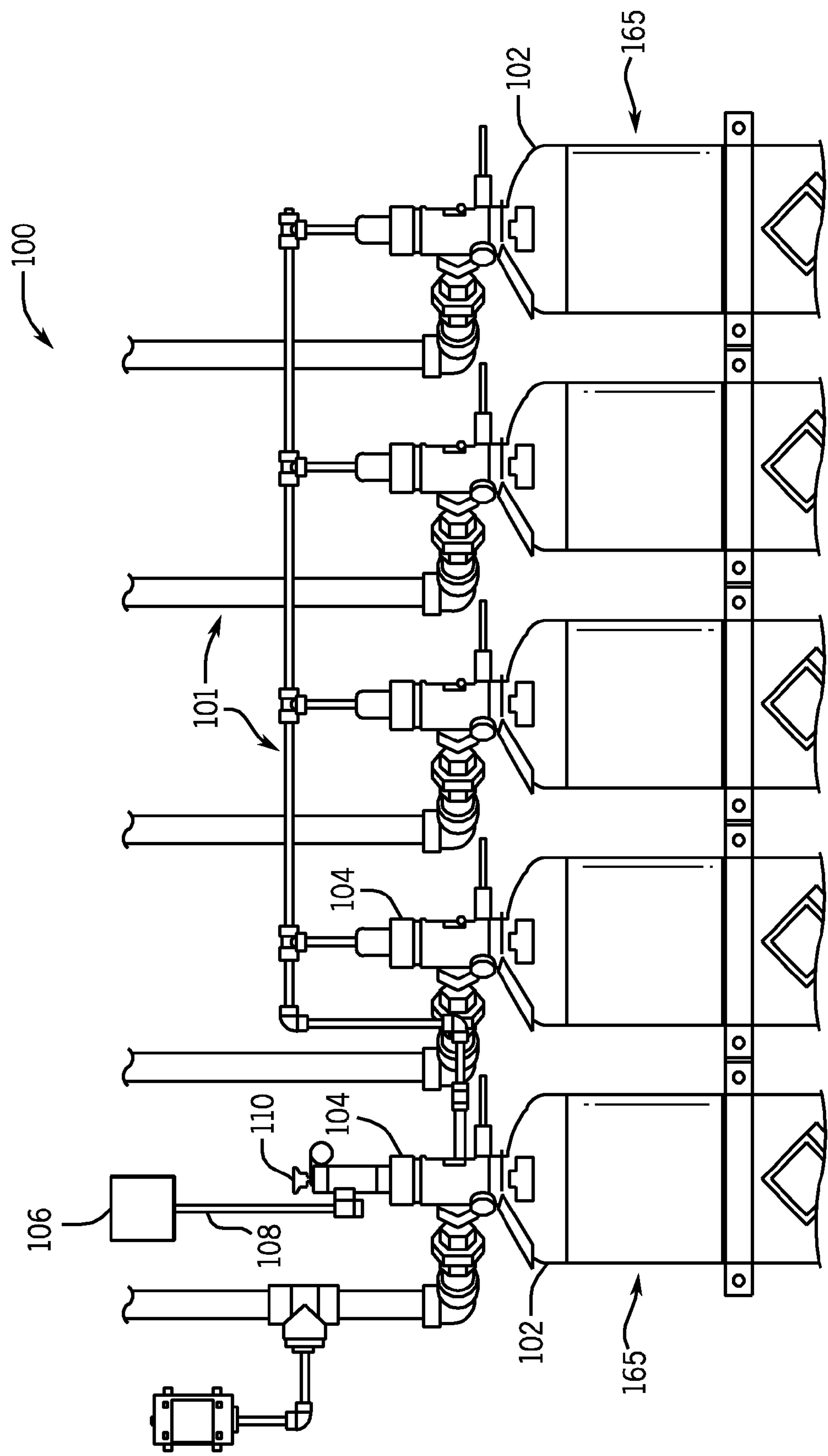
FIG. 1 is a partial perspective view of a fire suppression system, including a plurality of pressurized containers coupled to a plumbing system, with one container coupled to a pressure valve and latching solenoid having a mechanical sensor.

Referring to FIGS. 1-8, an exemplary embodiment of a fire suppression system 100 is illustrated in FIG. 1. A plurality of pressurized cylinders 102 are coupled to plumbing 101 consisting of a variety of tubes and pipes of various sizes. The plumbing 101 is installed, for example in a building, at various locations within the building. The pressurized cylinders 102 contain, typically a fire suppression fluid 164, with the system configured to deliver the fire suppression fluid 164, from the pressure cylinders 102 through the plumbing 101, to a location associated with the fire detection or fire alarm switch. The delivery of the fire suppression fluid 164 is initiated, typically by a latching solenoid 110 which activates a pressure valve 104 coupled to each of the pressure cylinders 102. The solenoid 110 operates to move the pressure valve to release the fire suppression fluid 164 from the pressurized cylinder 102 to deliver the suppressive material to a fire.

Because the pressure cylinders 102 have to be replaced after use, or replaced because of damage or expiration of useful life, mechanisms have been used to determine whether or not the pressure cylinders are installed in the fire suppression system 100. A typical method is to use electrical conductivity to determine if the pressure cylinders are installed in the system. Although electrical continuity systems will indicate if the pressure cylinder is installed, such system does not typically indicate if the pressure cylinder is properly installed for operation. For example, if the pressure cylinder and pressure valve are not fully seated in a coupling with the latching solenoid the latching solenoid will not be in a position to operate the pressure valve to release the fire suppression fluid from the pressure cylinder.

This disclosure provides a mechanical sensor 114 coupled to a latching solenoid 110 that will provide an indication that a pressure cylinder 102 and pressure valve 104 are properly coupled in a fire suppression system 100. The solenoid 110 is coupled to a controlled unit 106 through control wiring 108. The control unit 106 (also referred to as a controller) and control wiring 108 provide electrical power to the latching solenoid 110 and signal data from the mechanical sensor 114.

Figure 2:
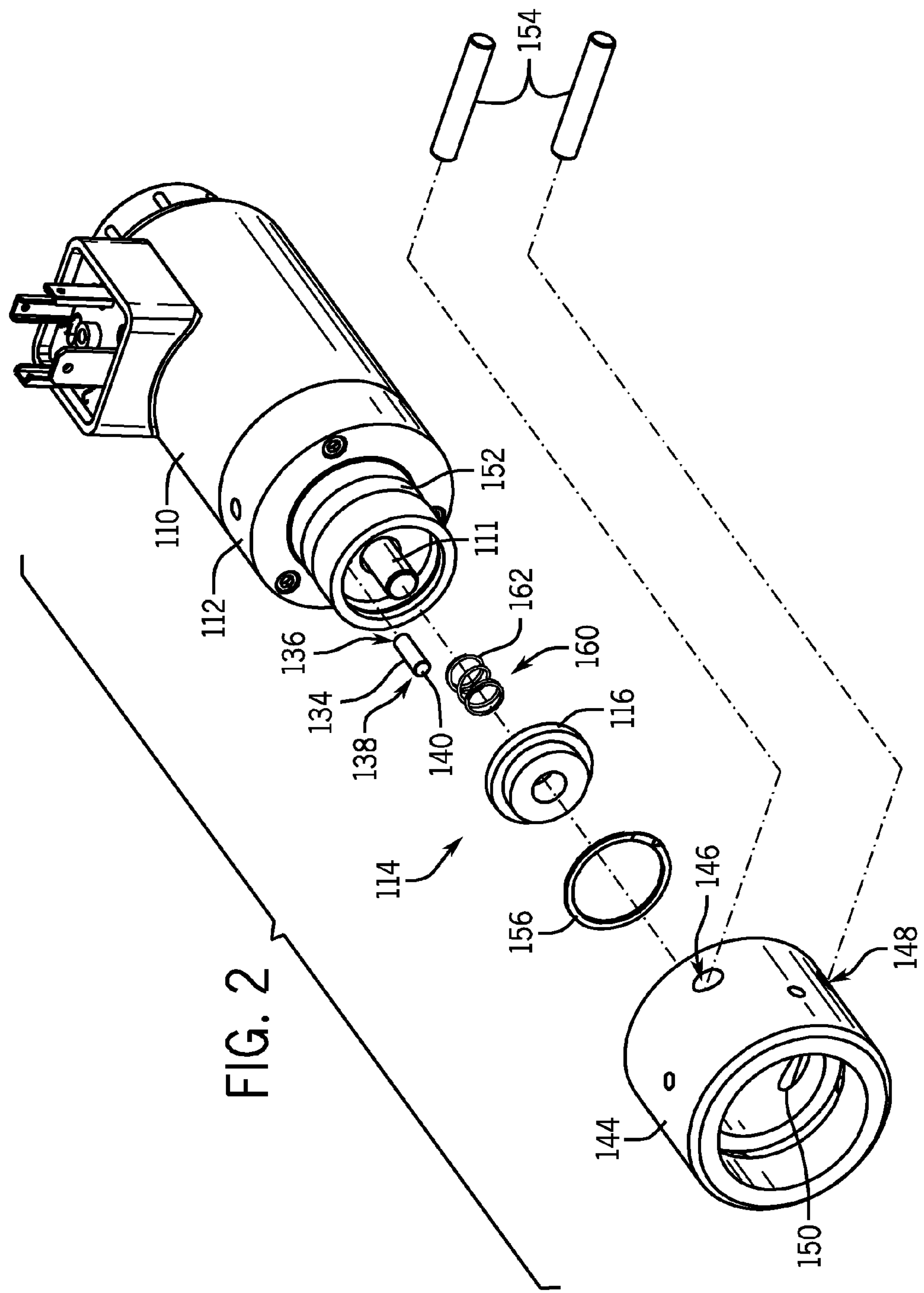
FIG. 2 is an exploded, perspective view of an exemplary embodiment of a mechanical sensor, adaptor, and latching solenoid.

As illustrated in FIG. 2, a latching solenoid 110 includes a nose piece 112. The nose piece 112 defines a first bore 118. The first bore defines a first portion 120, a second portion 122, and a third portion 124. Each of the portions is defined by a different inner diameter $D_1$, $D_2$, and $D_3$ respectively. (See FIG. 3) The first bore 118 extends through the full length of the nose piece 112. A solenoid pin 111 is disposed within the third portion 124 of the first bore 118 and has a diameter of approximately the same inside dimension as the third portion 124 of the first bore 118. The solenoid pin 111 is moved by the solenoid mechanism when the latching solenoid 110 is activated. The solenoid pin 111 is pushed to engage the pressure valve 114 to release the fire suppression fluid 164 from the vessel 165.

Figure 3:
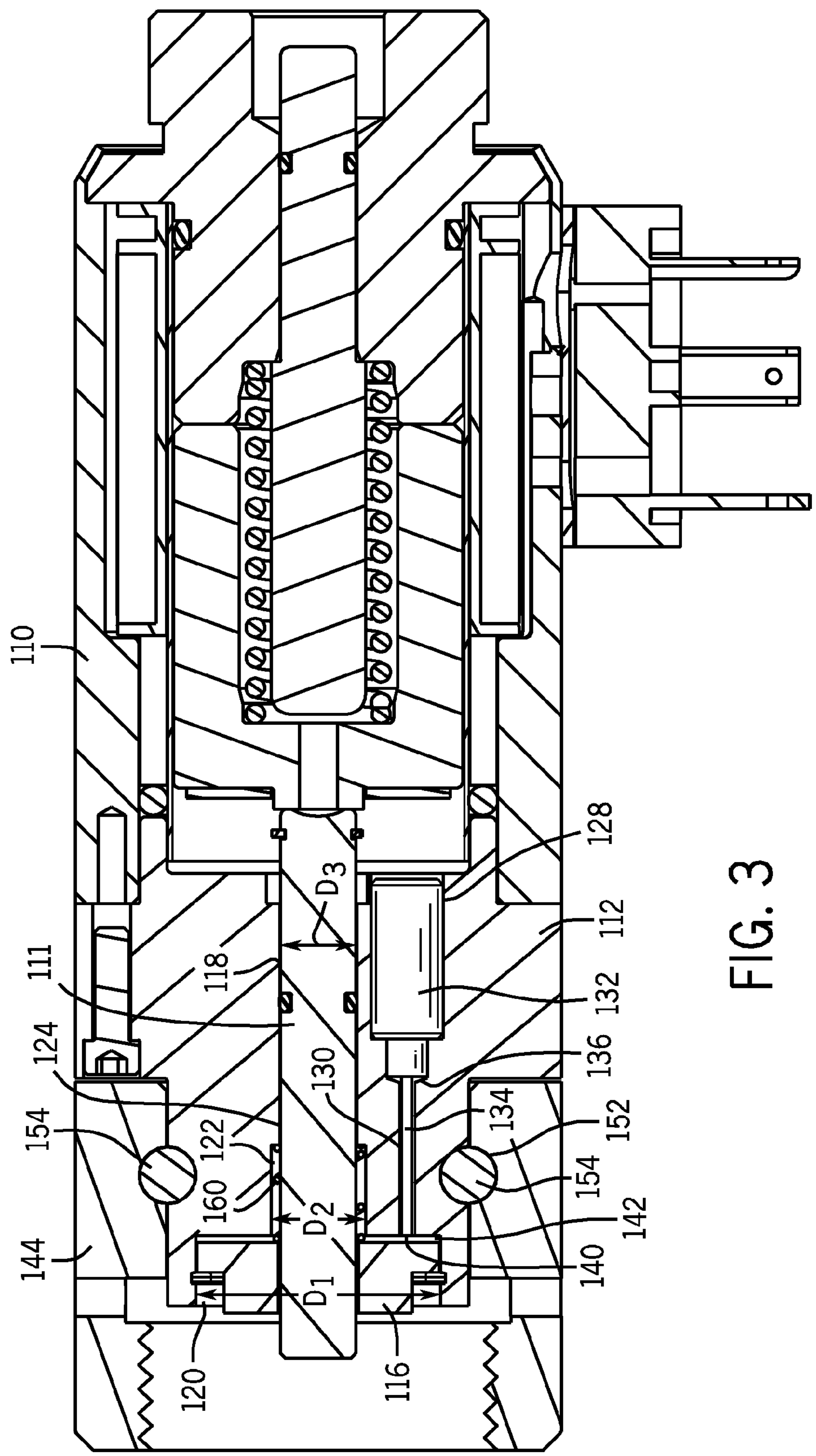
FIG. 3 is a section plan view of the mechanical sensor, adaptor, and latching solenoid illustrated in FIG. 2 assembled.
Figure 4:
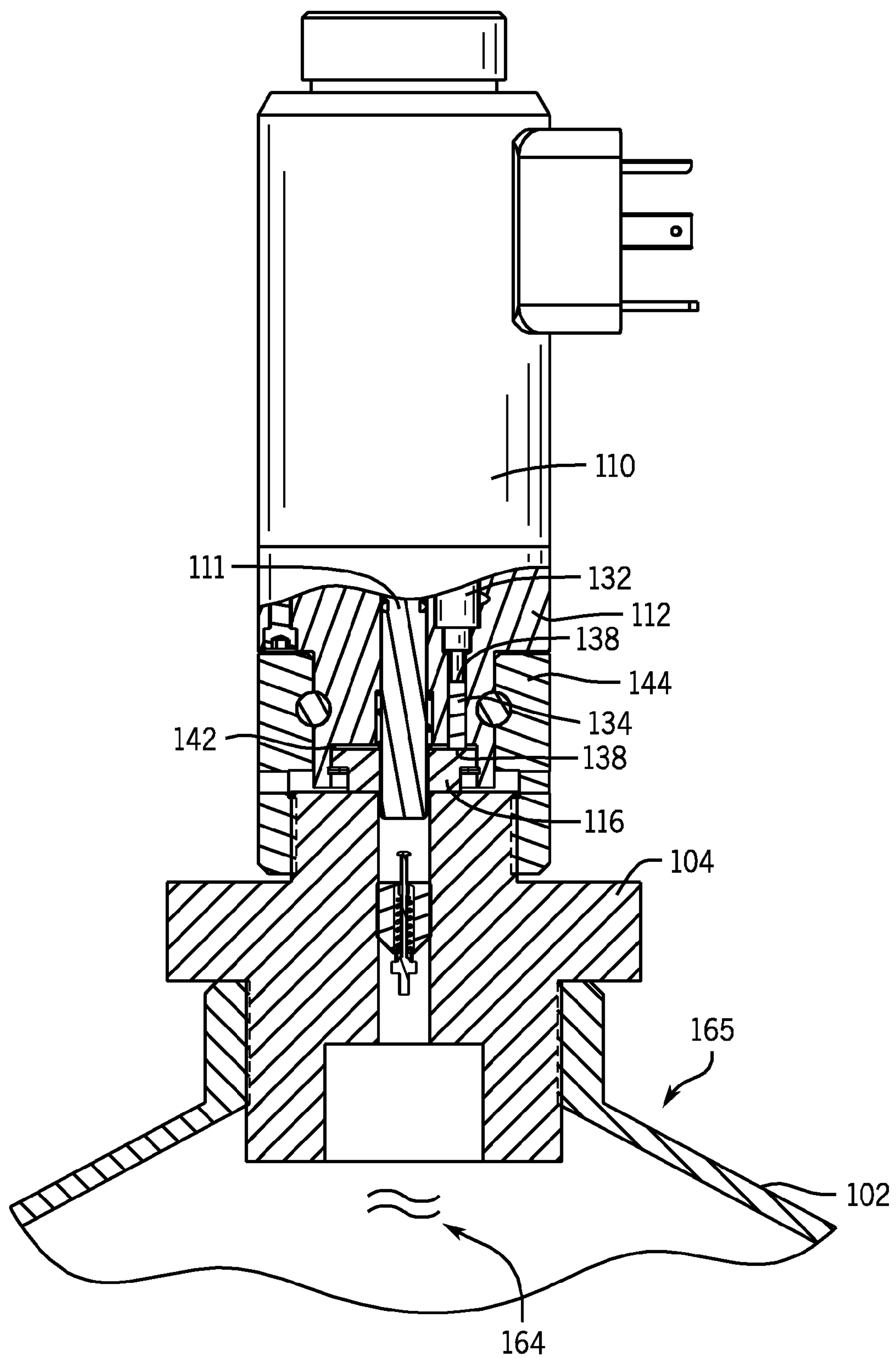
FIG. 4 is a partial plan view of a mechanical sensor, adaptor, and latching solenoid coupled to a pressurized vessel with the solenoid not fully, properly engaged with the pressurized vessel.
Figure 5:
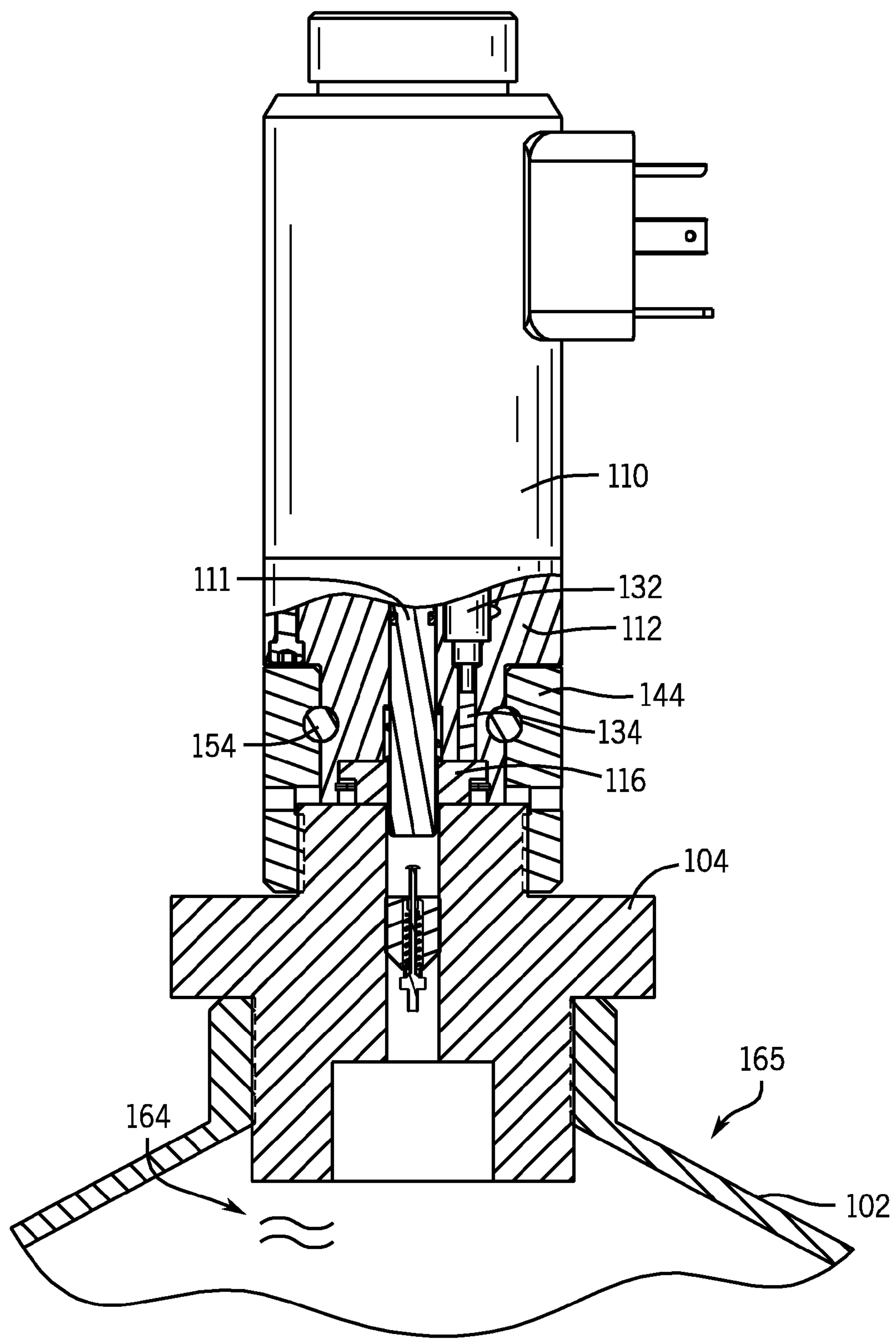
FIG. 5 is a partial plan view of mechanical sensor, adaptor, and latching solenoid coupled to a pressurized vessel with the solenoid fully, properly engaged with the pressurized vessel.
Figure 6:
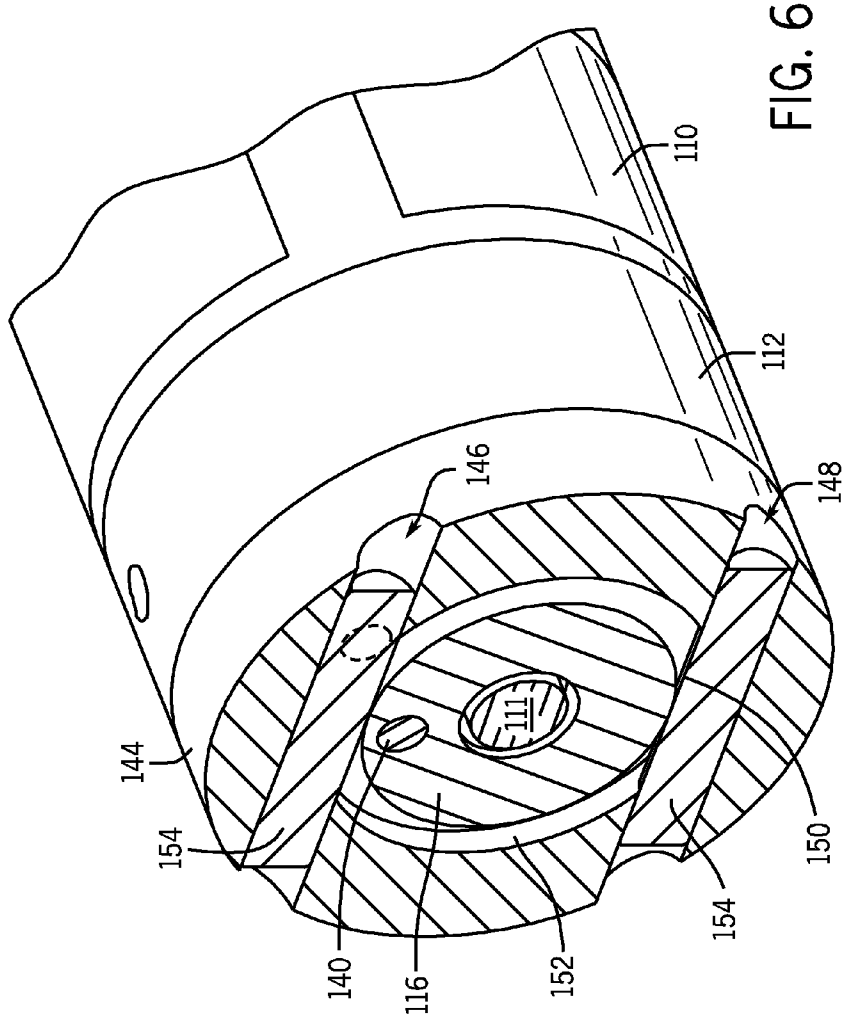
FIG. 6 is a partial, perspective view of the adaptor illustrated in FIG. 3 coupled to the solenoid with two dowels, with the adaptor configured for rotational engagement with a nose piece of the solenoid and the pressure valve.
Figure 7:
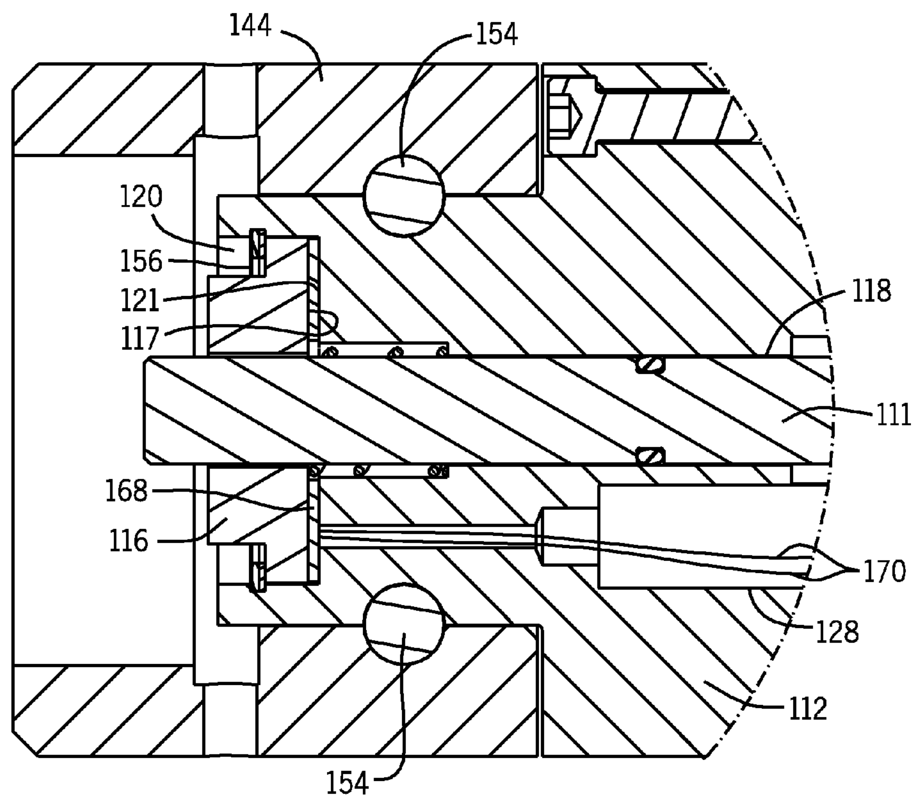
FIG. 7 is a partial, cross-section view of the mechanical sensor illustrated in FIG. 3 with a pressure sensitive film coupled to the disk and without an electric switch and switch push pin in the second bore.
Figure 8:
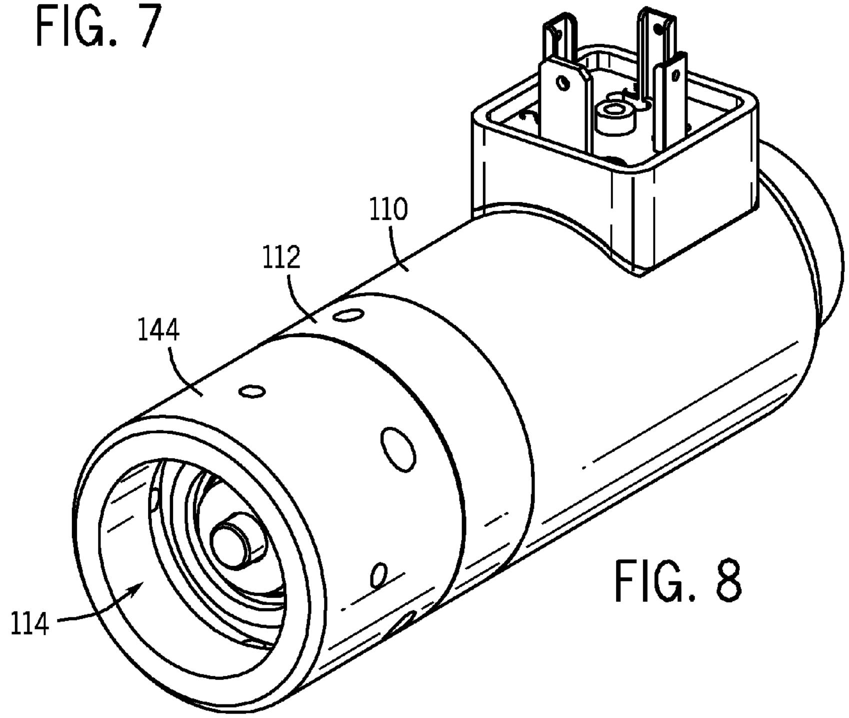
FIG. 8 is a perspective view of the assembled latching solenoid illustrated in FIG. 2, including the mechanical sensor.

The mechanical sensor 114 includes a disk 116 which is configured to fit within the first portion 120 of the first bore 118 defined in the nose piece 112. The disk 116 typically is round in shape and may have a step profile as illustrated in FIGS. 2 and 3. The disk 116 can be composed of any convenient material, for example, metal, engineered plastic, composite material or any combination of such material suitable for the application. The disk 116 is further configured for reciprocal, axial movement within the first portion 120 of the first bore 118. The disk 116 defines a central hole through which the solenoid pin 111 extends. The disk 116 is retained within the nose piece 112 by a retainer member 156. The retainer member 156 can be for example a snap-ring as illustrated in FIG. 2. The retainer member 156 prevents the disk 116 from moving out of the nose piece 112 and away from the latching solenoid 110.

A biasing member 160, for example a compression spring 162, is fitted within the second portion 122 of the first bore 118. The biasing member 160 forces the disk 116 away from a back wall defined in the nose piece 112 by the first portion 120 of the first bore 118. The pre-determined axial distance 142 resulting from the bias force of the bias member 160 prevents the disk 116 from initially contacting a switch push pin 134 described below.

The back surface (herein defined as the surface facing the solenoid 110) of the disk 116 can define an annular groove configured for engagement with the switch push pin 134. In a preferred embodiment, the surface of the disk 116 that contacts the switch push pin 134 is planer along its entire surface.

In another embodiment a pressure sensitive film 168 device, for example a flexible membrane potentiometer having a lower power requirement and a linear output, is disposed between the back surface 117 of the disk 116 and back wall 121 of the first portion 120 of the first bore 118. In this embodiment there is no electrical switch or switch push pin in second bore 128. Sensor wires 170 coupled to the pressure switch film 168 and the control unit 106 pass through the second bore 128. When the pressure valve 104 is properly coupled to the latching solenoid 110, the pressure valve 104 pushes the disk 116 back against back wall 121 of the bore squeezing the pressure sensitive film 168 and generating a signal through the sensor wires 170 to the control unit 106, indicating proper engagement of the pressure valve 104 with the latching solenoid 110.

The nose piece 112 also defines a second bore 128. An electrical switch 132 is disposed in the second bore 128 of the nose piece 112. The electrical switch 132 is coupled to the control unit through control wiring 108 and an electrical connector associated with the latching solenoid 110. The electric switch can be one of a normally open switch and a normally closed switch.

A portion 130 of the second bore 128 is configured to receive the switch push pin 134. The switch push pin 134 is in physical contact at one end 136 with the electrical switch 132 and with a second end 138 extending into the first portion 120 of the first bore 118. (See FIGS. 4 and 5) The second end of the switch push pin 134 is configured with one of a dome, a foot 140, and a cone. A base of the dome and cone will have the same diameter as the switch push pin 134. The switch push pin 134 can be composed of any convenient material, for example, metal, engineered plastic, composite material, or any combination of such material suitable for the application. The switch push pin 134 is cylindrical in shape and configured to move in the portion 130 of the second bore 128.

When the pressure valve 104 is properly coupled to the latching solenoid 110 the pressure valve 104 contacts the disk 116 and moves the disk back against the switch push pin 134. The switch push pin 134 moves against the switch 132 to change the status of the electrical switch 132 to indicate that the pressure valve 104 is properly coupled to the latching solenoid 110. It should be understood that when reference is made to the pressure valve, it includes not only the operative valve pin but also the valve housing. Typically it is the valve housing that is coupled to the latching solenoid 110 through an adapter 144 which will be described below.

The mechanical sensor 114 is configured such that the disk 116 is maintained in a floating position in the first portion 120 of the first bore 118 in the nose piece 112. The disk 116 is maintained in a coupled position by the bias member 160. When the latching solenoid 110 is coupled to the pressure valve housing 104, a male connector segment of the pressure valve housing pushes against the disk 116 and moves the disk 116 back the predetermined axial distance 142 thereby pushing the switch push pin 134 back against the electrical switch 132 thereby changing the status of the electrical switch. Such status change of the switch 132 generates a signal (ON or OFF) to the control unit 106 to indicate that the pressure value 104 and its associated pressure cylinder 102 is properly fully engaged with the latching solenoid 110. Movement of the disk 116 the predetermined axial distance 142 is calibrated to indicate that at least 90% of the male connector segment of the pressure valve 104 is inserted in the adapter 144 which couples the latching solenoid 110 to the pressure valve 104.

The adapter 144 defines a threaded female portion which is configured to engage the male portion of the pressure valve 104. As described above, the threading of the adapter 144, which is coupled to the nose piece 112 of the latching solenoid 110, must extend at least 90% of the distance into the female portion of the adapter 144 in order for the pressure valve 104 to contact and move the disk 116 back against the switch push pin 134.

The adapter 144 is coupled to the nose piece 112 in such a manner that the adapter 144 can rotate completely around the nose piece 112 as the adapter 144 threadingly engages the pressure valve 104. The nose piece 112 defines an annular groove 152. The adapter 144 also defines two traverse throughbores 146, 148 with each throughbore configured to intersect a portion 150 of the axial bore defined in the adapter with the two throughbores 146, 148 aligned with the annular groove 152 defined in the nose piece 112. (See FIGS. 3 and 5) A dowel 154 is disposed in each through bore 146, 148 when the nose piece 112 is inserted into the adapter 144. Each dowel 154 engages the annular groove 152 securing the adapter 144 to the nose piece 112 but allowing the adapter 144 to rotate about the nose piece 112.

The control unit, also referred to as a controller 106 may be a microprocessor coupled to the various apparatus of the system. The controller 106 may also be a server coupled to an array of peripherals or a desktop computer, or a laptop computer, or a smart-phone. It is also contemplated that the controller is configured to control each individual latching solenoid and may be remote from any of the apparatus. Communication between the controller 106 and the various apparatus may be either by hardwire or wireless devices. A memory/data base coupled to the controller may be remote from the controller 106. The controller 106 typically includes an input device, for example a mouse, or a keyboard, and a display device, for example a monitor screen or a smart phone. Such devices can be hardwired to the controller or connected wirelessly with appropriate software, firmware, and hardware. The display device may also include a printer coupled to the controller 106. The display device may be configured to mail or fax reports as determined by a user. The controller 106 may be coupled to a network, for example, a local area network or a wide area network, which can be one of a hardwire network and a wireless network, for example a Bluetooth network or internet network, for example, by a WIFI connection or "cloud" connection.

For purposes of this disclosure, the term "coupled" means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or the two components and any additional member being attached to one another. Such adjoining may be permanent in nature or alternatively be removable or releasable in nature.

Although the foregoing description of the present mechanism has been shown and described with reference to particular embodiments and applications thereof, it has been presented for purposes of illustration and description and is not intended to be exhaustive or to limit the disclosure to the particular embodiments and applications disclosed. It will be apparent to those having ordinary skill in the art that a number of changes, modifications, variations, or alterations to the disclosure as described herein may be made, none of which depart from the spirit or scope of the present disclosure. The particular embodiments and applications were chosen and described to provide the best illustration of the principles of the disclosure and its practical application to thereby enable one of ordinary skill in the art to utilize the disclosure in various embodiments and with various modifications as are suited to the particular use contemplated. All such changes, modifications, variations, and alterations should therefore be seen as being within the scope of the present disclosure as determined by the appended claims when interpreted in accordance with the breadth to which they are fairly, legally, and equitably entitled.

What is claimed is:

1. A mechanical sensor coupled to a latching solenoid, with the solenoid including a nose piece, the solenoid coupled to a control unit and to a pressure valve on a vessel, the sensor comprising:

a disk configured for reciprocal, axial movement within a first portion of a first bore defined in the nose piece;

an electrical switch disposed in a second bore defined in the nose piece, the electrical switch coupled to the control unit; and a switch push pin disposed in a portion of the second bore, with the switch push pin in physical contact at one end with the electrical switch, and with a second end extending into the first bore, wherein when the pressure valve is coupled to the latching solenoid, the pressure valve contacts the disk and moves the disk back against the switch push pin to change the status of the electrical switch to indicate that the pressure valve is properly coupled to the latching solenoid.

2. The mechanical sensor of claim 1, further comprising an adaptor, with the adaptor configured for rotational engagement with the nose piece and the pressure valve.

3. The mechanical sensor of claim 2, wherein the adaptor defines two traverse throughbores, with each throughbore configured to intersect a portion of an axial bore defined in the adaptor with the two throughbores aligned with an annular groove defined in the nose piece, wherein a dowel disposed in each throughbore will engage the annular groove securing the adaptor to the nose piece and allowing the adaptor to rotate about the nose piece.

4. The mechanical sensor of claim 1, wherein the status of the electrical switch is one of a normally OPEN switch and a normally CLOSED switch.

5. The mechanical sensor of claim 1, wherein the vessel is a pressure cylinder containing a fire suppression fluid.

6. The mechanical sensor of claim 1, wherein the second end of the switch push pin is configured with one of a dome, a foot, and a cone.

7. The mechanical sensor of claim 1 further comprising a bias member disposed in a second portion of the first bore and configured to force the actuator towards the pressure valve.

8. The mechanical sensor of claim 7, wherein the bias member is a compression spring.

9. A latching solenoid for a pressurized vessel having a pressure valve, the latching solenoid comprising:

a solenoid coupled to a control unit and configured to operate the pressure valve;

a nose piece coupled to the solenoid;

a first bore defined in the nose piece, with the first bore including a first portion, a second portion, and a third portion, with each portion having a different inside diameter;

a disk disposed in the first portion of the first bore, the disk configured to move a predetermined axial distance in the first portion;

a bias member disposed in the second portion of the first bore, the bias member configured to force the disk against a retainer member disposed in the nose piece;

a second bore defined in the nose piece and in communication with the first portion of the first bore;

an electrical switch disposed in the second bore, the electrical switch coupled to the control unit; and a switch push pin disposed in a portion of the second bore, with the switch push pin in physical contact at one end with the electrical switch, and with a second end extending into the first bore, wherein when the pressure valve is coupled to the latching solenoid, the pressure valve contacts the disk and moves the disk the predetermined axial distance back against the switch push pin to change the status of the electrical switch to indicate that the pressure valve is properly coupled to the latching solenoid.

10. The latching solenoid of claim 9, further comprising an adaptor, with the adaptor configured for rotational engagement with the nose piece and the pressure valve.

11. The latching solenoid of claim 10, wherein the adaptor defines two traverse throughbores, with each throughbore configured to intersect a portion of an axial bore defined in the adaptor with the two throughbores aligned with an annular groove defined in the nose piece, wherein a dowel disposed in each throughbore will engage the annular groove securing the adaptor to the nose piece and allowing the adaptor to rotate about the nose piece.

12. The latching solenoid of claim 9, wherein the status of the electrical switch is one of a normally OPEN switch and a normally CLOSED switch.

13. The latching solenoid of claim 9, wherein the vessel is a pressure cylinder containing a fire suppression fluid.

14. The latching solenoid of claim 9, wherein the second end of the switch push pin is configured with one of a dome, a foot, and a cone.

15. The latching solenoid of claim 9, wherein the bias member is a compression spring.

16. A method of sensing if a pressure valve attached to a vessel is properly coupled to a latching solenoid, the latching solenoid includes a nose piece and an adaptor configured for rotational engagement with the nose piece and the pressure valve, the method comprising:

installing a disk in a first bore defined in the nose piece, the disk configured for reciprocal axial movement within the first bore;

installing an electrical switch in a second bore defined in the nose piece, the electrical switch coupled to a control unit coupled to the latching solenoid;

installing a switch push pin in a portion of the second bore, with the switch push pin positioned to make physical contact with the electrical switch at one end of the push pin and another end of the push pin extending into the first bore; and installing the pressure valve in the adaptor a distance sufficient to push the disk axially a predetermined distance back in the first bore to contact the switch push pin; and moving the switch push pin to contact the switch to change the status of the electrical switch indicating that the pressure valve is properly coupled to the latching solenoid.

17. The method of sensing if a pressure valve attached to a vessel is properly coupled to a latching solenoid, of claim 16, wherein the distance sufficient to push the disk in the first bore is at least ninety percent of the axial length of a first portion of the first bore.

18. The method of sensing if a pressure valve attached to a vessel is properly coupled to a latching solenoid, of claim 16, wherein the adaptor defines two traverse throughbores, with each throughbore configured to intersect a portion of an axial bore defined in the adaptor with the two throughbores aligned with an annular groove defined in the nose piece, wherein a dowel disposed in each throughbore will engage the annular groove securing the adaptor to the nose piece and allowing the adaptor to rotate about the nose piece.

19. The method of sensing if a pressure valve attached to a vessel is properly coupled to a latching solenoid, of claim 16, wherein the status of the electrical switch is one of a normally OPEN switch and a normally CLOSED switch.

20. The method of sensing if a pressure valve attached to a vessel is properly coupled to a latching solenoid, of claim 16, wherein the vessel is a pressure cylinder containing a fire suppression fluid.

* * * * *